March 2, 1937.  G. R. VOLKERT  2,072,693

HYDRAULIC CONTROL APPARATUS

Filed Feb. 23, 1934  2 Sheets-Sheet 1

INVENTOR
George Rudolph Volkert
BY
Kenyon & Kenyon
ATTORNEYS

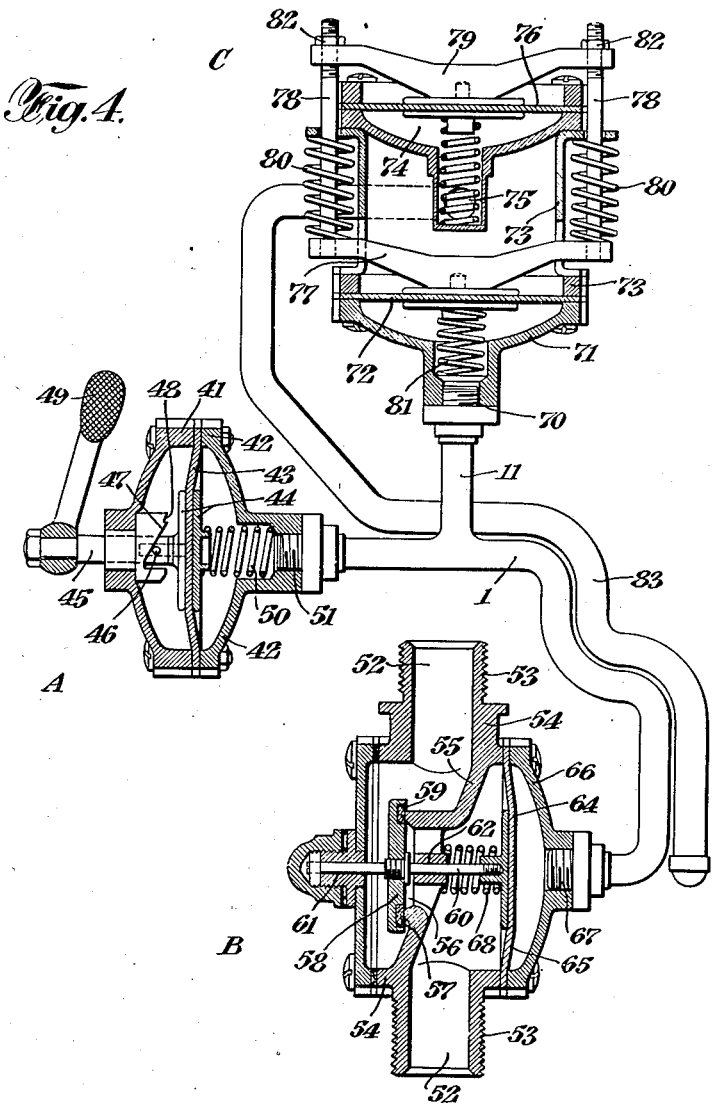

Patented Mar. 2, 1937

2,072,693

UNITED STATES PATENT OFFICE 2,072,693

HYDRAULIC CONTROL APPARATUS

George Rudolph Volkert, London, England, assignor of one-half to Automotive Products Company Limited, London, England Application February 23, 1934, Serial No. 712,679
In Great Britain February 23, 1933

1 Claim. (Cl. 60—54.5)

This invention relates to hydraulic control apparatus and has particular reference to such apparatus in which movement or energy is required to be transmitted over a considerable distance.

An object of the invention is to render such systems virtually immune from ill effects of temperature change in the whole system. A further object is to render such systems immune from temperature change in any part or parts of the system. In this connection it is observed that in certain circumstances, for example in aircraft installations, one part of a pipeline may be rapidly cooled, whereas another part may be rapidly heated simultaneously, and the problem of thermostatic control of expansion and contraction is thus a far from straightforward one.

A further object of the invention is to enable a hydraulic system readily to be adjusted either by an operator or by thermostatic means.

With this and other objects in view the invention consists broadly in the provision, in combination with a hydraulic pipeline in energy or movement-transmitting apparatus with what I term a shadow line, or any other hydraulically operated thermostat element which will be sensitive to the same temperature changes as those which may be expected to affect the main pipeline; and the invention provides means whereby a hydraulic thermostat element is adapted to influence the effective volumetric content of the main pipeline and associated parts, whereby such volume may be increased or decreased, or kept constant in accordance with temperature change.

The invention can be seen from the accompanying drawings, in which it is shown in various adaptations.

Figure 1 diagrammatically illustrates the invention as applied to a simply conceived hydraulic system. This figure is purely diagrammatic for the purpose of demonstrating the underlying idea of the invention;

Figure 4 illustrates a practical application of the device to a petrol cock operating apparatus, in which A illustrates a sectional elevation or plan of an operating element adapted for the particular purpose of operating a remotely positioned petrol cock; B being a similar view of the petrol cock; and C is a partly sectioned elevation of a thermostatically controlling device.

Figure 1:
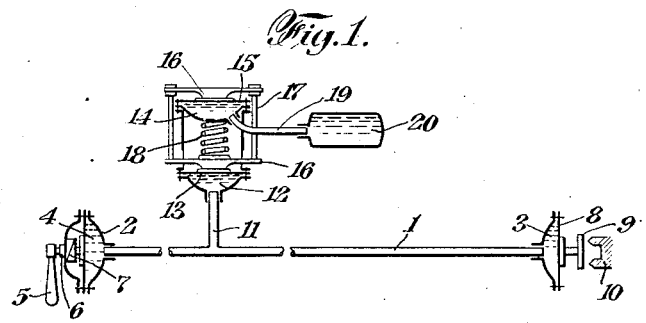

Referring now to Figure 1, a hydraulic movement or energy-transmitting apparatus comprises a main pipeline 1 connecting a closed chamber 2 with a closed chamber 3. One wall of the chamber 2 is a deformable diaphragm 4 movable towards or away from the contents of the chamber by means of a lever 5 on a spindle 6 with any suitable screw thread or inclined plane device indicated at 7. The chamber 3 is similarly closed by a diaphragm 8 which has directly connected with it an operated element 9; the distance of which in relation to a fixed point 10 is shown diagrammatically. The main pipe 1 has a branch 11 connecting it to a compensating chamber 12 again closed by a deformable diaphragm 13. The wall of the chamber 12 forms a part of a rigid structure which at its upper end carries another chamber 14 with a deformable diaphragm wall 15. A rigid arrangement comprising two cross heads 16 is interconnected by rods 17. The cross heads 16 both bear downwards on the diaphragms 13 and 15, and they are urged towards the diaphragms by the compression spring 18 which resides between the bottom rigid wall of the chamber 14 and the lower cross head 16. The chamber 14 is connected with a secondary pipeline 19 which puts its contents in connection with a thermostat capsule 20. Although not so illustrated diagrammatically, the capsule 20 is so positioned and constituted as to be sensitive to the same variations of temperature as the main pipe 1. It is preferred that the volume of the capsule 20, pipe 19 and chamber 14 is equal to or thermally equivalent to the volume of the chambers 2 and 3 and the pipeline 1. It need hardly be mentioned, however, that these volumes may be proportionated by, for example, halving the volume of the thermostat system and halving the effective area of its diaphragm 15, or perhaps the volumes may be chosen having regard to some differences of temperature which must inevitably exist (owing to special circumstance) between the thermostat and the pipeline to be compensated. The operation of the device will be fairly obvious; the pipeline 1 and chambers 2 and 3 simply form a remote hydraulic movement or energy transmitter operated by handle 5 and varying the distance between 9 and 10. Let it be assumed that the atmospheric temperature rises and consequently the liquid in this system expands. Were it not for compensation the distance between 9 and 10 would clearly be diminished; but the liquid in 14, 19, 20 is assumed equally to expand, and this causes the diaphragm 15 to deform outwardly so that the cross heads and rods 16, 17 rise and either allow to distort or actually effect distortion of the diaphragm 13, so that the expansion of operating fluid is precisely accommodated and therefore compensated. If, as preferred, the capsule 20 takes the form of what I call a shadow pipeline, which closely follows the layout of the pipe 1 in propinquity therewith, then any local temperature disturbance, apart from an overall disturbance, will be compensated just as effectively.

Figure 2:
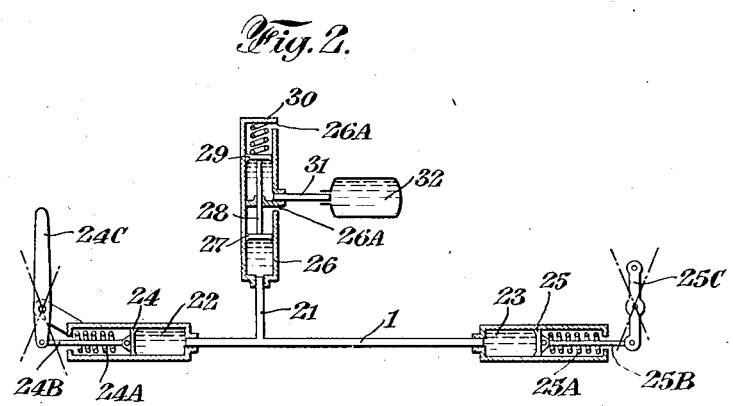
Figure 2 is a similar figure illustrating a slight variation or elaboration of the same idea.

Turning now to Figure 2, a slight variation of construction, but not of essential principle, is shown, and like parts are numbered alike. The main pipeline 1 interconnects cylinders 22 and 23 in which operate pistons 24 and 25 respectively, the pistons being held up to the liquid by compression springs 24A, 25A respectively and being on the one hand operated by rod 24B and lever 24C, and operating on the other hand by rod 25B and lever 25C. The pipe 1 has a branch 21 leading to a third cylinder 26 with a breather hole at 26A and having a piston 27 connected to a piston rod 28 and, thereby, to another piston 29 operating in an extension of the cylinder 26 through the bottom wall thereof. A compression spring 30 bears on the piston 29 in the upper part of the cylinder, which again has a breather hole 26A at the top. The upper part of the cylinder 26 has a pipe connection 31 to a thermostat capsule 32. In general the same remarks apply to this system as to that of Figure 1, the difference residing in the piston and cylinder arrangement rather than the deformable diaphragm arrangement. It will be observed that the spring 30 holds the piston 29 on to the thermostat liquid, and the position of this piston of course determines the position of the piston 27 and therefore the effective volumetric capacity of the main hydraulic system 1, 22, 23. In all such cases the spring 30 or equivalent loading should exert a pressure in excess of that expected in the hydraulic system having regard to the assistance it may receive from atmospheric pressure.

Figure 3:
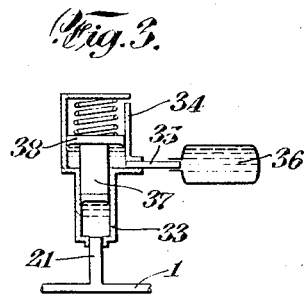
Figure 3 illustrates a detail of a further variation diagrammatically.

Figure 3 shows diagrammatically a variant in which a differential piston is used for compensation. In this case the main pipeline 1 is connected by a branch 21 to a lower cylinder 33 which has a coaxial upper cylinder extension 34 with a pipe connection 35 to the thermostat capsule 36. The cylinder 33 has working in it a plunger 37 with an upward extension which carries an annular piston head 38 working in the cylinder 34. The effective area of the piston 38 in relation to that of the piston 37 is prescribed according to the relative volumetric capacities of the thermostat system 35, 36, and the main hydraulic system 1 and auxiliary parts.

The remaining Figure 4 shows a practical application of the device to a petrol cock operating apparatus intended for use in aircraft where remote control is desired, together with precision of operation and freedom from temperature effect. The device consists broadly in a generator (A), a motor actuated cock or valve (B) and a thermal compensator union (C). These parts are interconnected by a pipeline and branch such as 1 and 11 of Figure 1, and the union of C is of course connected to a thermostat capsule or shadow pipeline 83. The operative element or generator of A comprises a chamber having two mutually bolted halves 41, 42 between which is secured the edge of a disc-like deformable diaphragm 43 which divides the chamber. The diaphragm 43 is secured by suitable washers or collars 44 to an axially movable and rotatable spindle 45 which has a radial pin at 46 to cooperate with a fixed inclined edge or cam 47 with preferably a dwell formed upon it at 48 to locate and indicate an extreme position in one direction, by restraining the movements of the pin 46. The spindle 45 carries a manual lever 49, and the diaphragm 43 and spindle 45 are all urged in one direction by a compression spring 50 housed between the diaphragm 43 and the casing member 42. This casing member 42 has a suitable union at 51 for connection to a pipeline such as 1 in the previous figures. It will be clear that angular movement of lever 49, by the coaction of the pin 46 and cam 47, causes axial movement of the diaphragm 43.

B illustrates a petrol cock or valve in a main petrol line indicated by the conduit 52 with unions 53 formed on a suitable body 54. The conduit 52 has through connection, through a diagonal wall 55 pierced by a port 56 with a knife or other valve seat 57 on which seats a disc valve 58 with any suitable seal such as a leather annular insert 59. The valve 58 is mounted on a sliding stem 60 mounted in suitable bearings at 61 and 62, and attached at one end by a washer or plate 64 to a deformable diaphragm 65 which is clamped by the edges of a casing member 66, to the body 54. The member 66 has a suitable union at 67 for connection with the pipeline 1. A compression spring 68 urges the diaphragm 65, stem 60 and valve 58 in the direction to seat and close the valve. It is of course assumed that the whole space of the system between the diaphragms 43 of A and 65 of B is completely filled with liquid of suitable nature. Now rotation of the lever 49, by appropriate movement of the diaphragm 43, will cause movement of the diaphragm 65 by hydraulic pressure and may thus be used to open or close the valve 58. In the event of a crash or other cause of pipeline breakage the hydraulic pressure will fail and the valve 58 will therefore close. If it it be so desired, the spring influence on the system may be reversed so that in the event of a pipeline failure the valve 58 will open.

C, connected to the pipeline 1 by union 70 of a cover plate 71 is the thermostat control unit. The cover plate 71 secures by its edges a diaphragm 72 to a body rigidly constituted and indicated by the parts 73. This rigid body carries another cover plate 74 similar to 71 with a union at 75 connecting it to shadow pipeline or thermostat capsule 83. The plate 74 together with a deformable diaphragm 76 forms an adjusting chamber affected by the temperature conditions of the thermostat. Connected to the diaphragm 72 is a cross head 77 which is connected in turn by rigid rods 78 to a second cross head 79 which is connected to the diaphragm 76. Between a fixed part of the body 73 and the cross head 77, and surrounding the rods 78, are compression springs 80. It will be appreciated that these springs have the effect of keeping the diaphragm 76 in compression on the thermostat liquid, but by yielding or expanding they allow the cross head 77 to follow the movements of the diaphragm 76; thus the diaphragm 72 is governed by the diaphragm 76 and consequently the effective volumetric capacity of the hydraulic system connected by the union 70 is likewise controlled. The springs 80 in their cumulative effect should not be less than the maximum working pressure to which the diaphragm 72 will be subjected. In some cases it may be convenient to employ a further compression spring 81 below the diaphragm 72 opposing the springs 80. The spring 81 is a light compression spring provided to urge the diaphragm 72 against the cross head 77 particularly when the system is empty.

In the above specific case or in any general case of application of the invention, means may readily be provided for initial manual adjustment. For example, nuts 82 may adjust the position of cross head 79 relative to rods 78 and thus, of course, relatively adjust the diaphragms 76 and 72. By this or equivalent means the precise effective volume of the operating hydraulic system may be set. For example, if the system were too full the diaphragm 72 could be somewhat raised, or conversely. It will be clear that this and like modifications may be applied without departure from the essential scope of the invention as defined by the following claim. It must also be appreciated that the invention is applicable to divers systems; for example in treating a two-pipeline hydraulic system a single shadow line may be employed in the vicinity of both of them, and where I refer to an operative or hydraulic pipeline I am not restricting myself to any particular form of conduit or number of conduits. It is preferred that the thermostat system above described be filled with characteristically similar liquid to the working system, or, one of which the physical characteristics either are or can effectively be made the same as that of the operating liquid. For example, a liquid with a less coefficient of expansion may be used, providing the effective volume is increased.

What I claim is:—

A hydraulic system for the transmission of force to a remote point comprising a liquid-filled force transmission line having at one point operating means for applying pressure to the liquid in the line and at another point operable means responsive to pressure variations in said line, means connected to said line for changing the volumetric capacity thereof, a closed liquid-filled auxiliary line independent of said operating and operable means, said auxiliary line being positioned alongside said force transmission line and being substantially co-extensive therewith, and a pressure sensitive element in said auxiliary line connected to said capacity changing means to actuate the same in response to temperature variations in said line.

GEORGE RUDOLPH VOLKERT.